(12) United States Patent
Sievers et al.

(10) Patent No.: US 6,182,694 B1
(45) Date of Patent: Feb. 6, 2001

(54) FUEL DELIVERY UNIT HAVING A LINE CONNECTION

(75) Inventors: Ralph Sievers, Bad Soden; Burkhard Dasbach, Eppstein; Rolf Reinhardt, Rotenberg, all of (DE)

(73) Assignee: Mannesmann VDO AG, Frankfurt am Main (DE)

( * ) Notice: Under 35 U.S.C. 154(b), the term of this patent shall be extended for 0 days.

(21) Appl. No.: 09/190,703

(22) Filed: Nov. 12, 1998

(30) Foreign Application Priority Data

Nov. 12, 1997 (DE) .............................. 197 50 037
May 27, 1998 (DE) .............................. 198 23 573

(51) Int. Cl.[7] .......................... F02M 37/10; F16L 19/03; F16L 21/02
(52) U.S. Cl. .................. 137/565.34; 285/319; 285/376; 285/912
(58) Field of Search ........................ 137/565.34, 565.17, 137/565.01, 574, 576; 285/319, 921, 179, 360, 361, 376, 396, 401, 402

(56) References Cited

U.S. PATENT DOCUMENTS

| 1,287,385 | * | 10/1918 | Martin | 285/319 X |
|---|---|---|---|---|
| 1,792,189 | * | 2/1931 | Robinson | 285/376 X |
| 4,878,816 | * | 11/1989 | Tuckey | 137/576 X |
| 4,928,657 | * | 5/1990 | Asselin | 137/576 X |
| 4,941,689 | * | 7/1990 | Sjoberg | 285/319 X |
| 5,330,475 | * | 7/1994 | Woodward et al. | 137/576 X |
| 5,341,842 | * | 8/1994 | Chih et al. | 137/574 |
| 5,582,198 | | 12/1996 | Nagino et al. . | |
| 5,692,783 | * | 12/1997 | Watanabe et al. | 285/319 X |

FOREIGN PATENT DOCUMENTS

| 3018242 | 5/1980 | (DE) . |
|---|---|---|
| 4128128 | 8/1991 | (DE) . |
| 4403063 | 2/1994 | (DE) . |
| 0191362 | 1/1985 | (EP) . |

\* cited by examiner

*Primary Examiner*—John Rivell
(74) *Attorney, Agent, or Firm*—Mayer, Brown & Platt

(57) ABSTRACT

The invention relates to a fuel delivery unit for use in fuel tanks of vehicles, having a pump with a housing (2) and at least one outlet opening (3) arranged laterally thereon, having a reservoir (1) which can be filled with fuel and into which the pump can be inserted with little lateral installation space and from whose filling volume fuel is delivered to the outlet opening (3), and a line (15), in particular a rising line, which can be connected to the outlet opening (3), wherein at least the one line (15) can be connected to the outlet opening (3) by means of a releasable, pressure-sealed plug-in connection (S), it being possible for the outlet flow to be deflected in the region of the plug-in connection (S) by means of an elbow (6a).

12 Claims, 3 Drawing Sheets

# FUEL DELIVERY UNIT HAVING A LINE CONNECTION

FIELD OF INVENTION

The invention relates to a fuel delivery unit having a line connection in accordance with the features of the preamble of patent claim 1.

BACKGROUND OF THE INVENTION

A tank of motor vehicles contains a fuel delivery unit which essentially comprises a reservoir (splash pot), a fuel pump which is arranged therein and delivers fuel from there to the combustion engine, a further pump for filling the reservoir, and various lines. The reservoir, which is of cylindrical design (large height in relation to the base surface), ensures, by means of its limited volume, that the fuel pump is able constantly to take in fuel even in the case of prolonged accelerations in the plane of the road.

The further pump mentioned above can be a separate suction jet pump. Its driving jet can be fed by the return flow from an injection system or by the outward flow from the fuel pump.

It is also known to use a two-stage, motor-driven fuel pump whose first stage (preliminary stage) takes in fuel from the fuel tank and delivers it via a rising pipe into the reservoir and whose second stage (main stage) then delivers the fuel to the combustion engine. In a variant thereto, the preliminary stage draws the fuel out of the reservoir and uses it, on the one hand, to feed the suction jet pump to refill the reservoir and, on the other hand, to feed an outward flow to the second pump stage.

The outlet opening of such a preliminary stage is situated laterally in the lower region of a pump housing. If the latter is inserted into the reservoir, the abovementioned mouth lying only slightly above the bottom of the relatively narrow and high reservoir, there is not a great deal of space between the housing wall and the reservoir wall. It is therefore very difficult to connect an outward-flow line or rising line with the pump installed. The finished connection itself also has to manage with little space. Although it would be conceivable to provide a rising line fastened to the pump housing or integrated into the reservoir, this contradicts the requirement of being able freely to use standardized mass-produced pumps having uniform external dimensions.

SUMMARY OF THE INVENTION

The invention is therefore based on the object, with regard to mass production, of providing a line connection which can be fitted in a simple and error-free manner, for a fuel flow emerging laterally from a pump housing.

This object is achieved according to the invention by means of the features of patent claim 1.

The fact that at least one line can be connected to the outlet opening by means of a releasable, pressure-sealed plug-in connection, it being possible for the outlet flow to be deflected in the region of the plug-in connection by means of an elbow, results in the advantage that this provides a connection which can be fitted in a simple and secure manner and which at the same time allows the connected line to fit closely against the housing of the pump. As a result, the space which is available is optimally used in an advantageous manner.

In a development of the invention, the pump end of the line is connected to a straight connector which can be plugged onto an angled connecting stub, which forms the elbow, of the outlet opening. This provides a first design embodiment of a pressure-sealed plug-in connection, in which the exit direction of the line is firmly specified. However, the connecting stub protrudes a relatively long way over the contour of the pump housing.

In a development of the invention, the pump end of the line is therefore connected to an angular connector which forms the elbow and which can be connected to a sleeve of the outlet opening, which sleeve is arranged laterally on the pump housing. In the case of a pump housing which is conventionally cylindrical, the axis of the outlet opening or outlet hole therefore runs at least approximately radially to the pump housing, whereas the rising line can run perpendicularly or obliquely upward in the narrow gap between the pump housing and the reservoir wall. Using an angular connector at the pump end, this requirement is therefore satisfied with the smallest possible distance between the line and the pump housing.

In a development of the invention, elastic latching elements which can be lifted for release, are provided to secure the plug-in connection. In addition to the simple fitting of such a plug-in connection which is known per se in a multiplicity of embodiments, this therefore also ensures simple release, with the result that rapid exchange of individual components is possible, if required.

In a development of the invention, the connector, which is arranged at the pump end of the line, is provided with elastic latching hooks which can be latched into corresponding abutments in the region of the outlet opening. This also makes possible rapid exchange and simple and error-free fitting. The latching hooks are preferably provided on the connector because the latter is simpler and cheaper to exchange in the event of damage than to undertake corresponding shaping of the pump housing. In a preferred embodiment, the latching hooks have latching lugs pointing away from one another, the advantage thereby being given of merely having to press the latching hooks together manually during removal in order to lift the latching lugs out of the abutments and to pull off the angular connector.

In a development of the invention, two corresponding latching pairs of latching hooks and abutments are provided on each side of the external circumference of the outlet opening. This also assists and simplifies the removal procedure.

In a development of the invention, the abutments are designed as bridge-like webs which are molded onto the pump housing and are relieved by slots.

This results in a simple and resistant structural shape of the pump-end abutments.

In a development of the invention, the webs are longer than the width of the latching hooks and extend in a curved manner concentrically to the outlet opening over a subregion of its circumference. This advantageously achieves a limited variability of the exit direction of the line within the scope of the available installation space. It is also conceivable to design the length of the webs to be only slightly larger than the width of the latching hooks, the advantage thereby being given that this provides precise, virtually play-free securing of the line against rotation.

A particularly simple structural shape of the connector at the pump end of the line is achieved by the connector having, in the region of its opening, a hollow cylindrical end section which can be introduced into a bushing surrounding the outlet opening at the pump end and can be sealed therein by means of a sealing ring.

In a development of the invention, the plug-in connection has a quarter-turn fastening so that the line connection can be connected to the pump housing by means of this quarter-turn fastening. A quarter-turn fastening of this type is known per se. The use in this case is advantageous since it not only provides rapid fitting but also, moreover, makes exchange of the line connection easily possible.

DESCRIPTION OF THE DRAWINGS

An exemplary embodiment is described in the following and is explained with reference to the drawings, in which.

DETAILED DESCRIPTION OF THE PREFERRED EMBODIMENT

Figure 1:
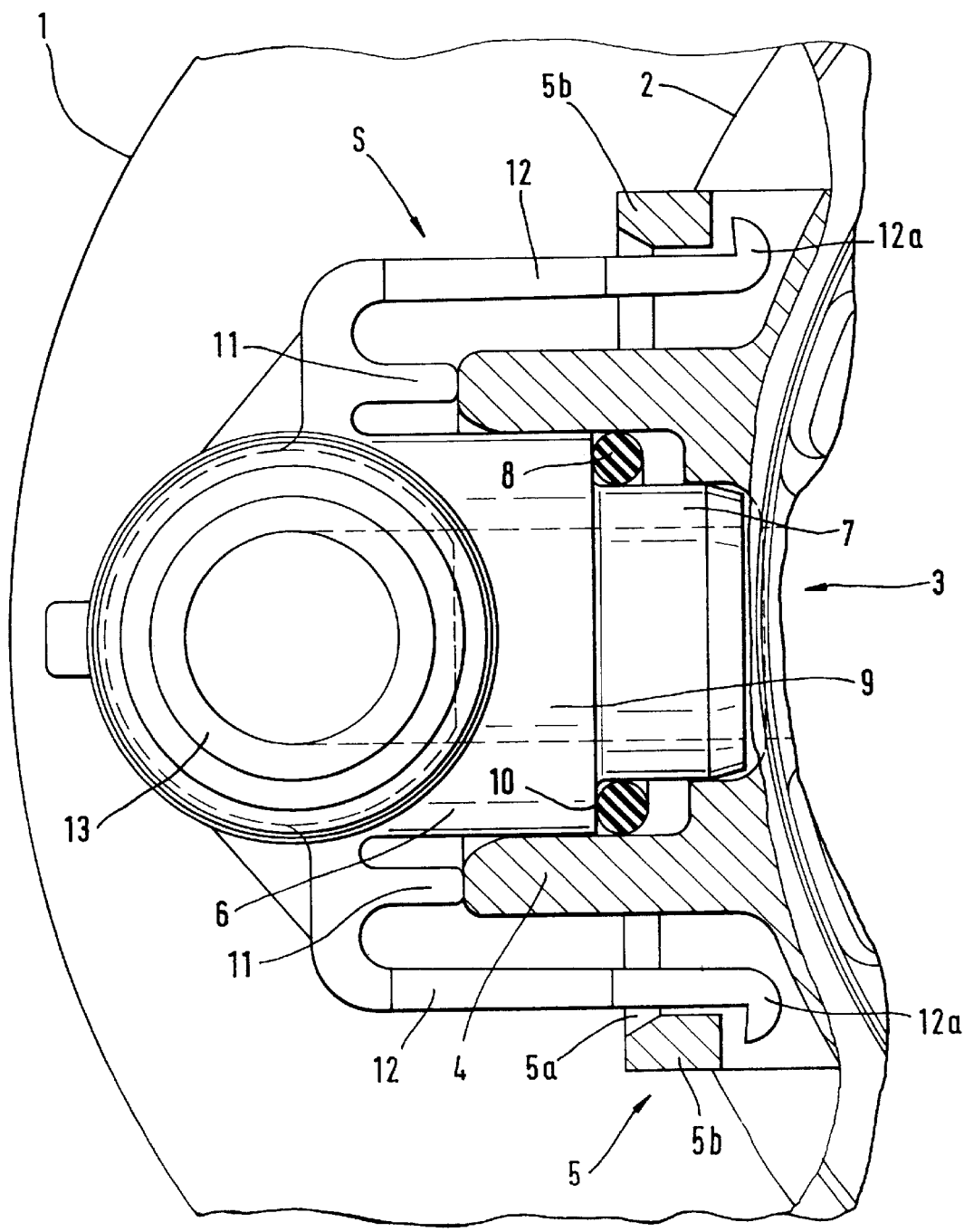
FIG. 1 shows a plan view of a detail of a pump housing in the region of an outlet opening and a plug-in connection for connecting a rising line.

In FIG. 1 it is shown that a cylindrical housing 2 (only some details of which are shown) of a fuel pump is inserted with little lateral installation space into a reservoir 1 (only indicated in outline). The fuel pump may, for example in a manner known per se, be a two-stage, electric motor-driven mass-produced pump which drives one or two pump wheels with a motor shaft and in its housing contains the associated ducts.

FIG. 1 furthermore shows an outlet opening 3 which emerges laterally or in the radial direction from the cylindrical housing 2. It is possible here for, for example, an outlet of a first pump stage (preliminary stage) to discharge, which first pump stage operates at a relatively low difference in pressure and the fuel flow of which feeds a suction jet pump to fill the reservoir 1. The outlet opening 3 is situated a small distance above the bottom of the reservoir 1 and next to its side wall. It is surrounded by a hollow cylindrical bushing 4 molded onto the housing 2. On each side of the external circumference of the bushing 4 abutments 5 are provided as passive latching elements, which abutments are, according to FIG. 1, designed as webs 5b relieved by slots 5a. The webs are preferably of bridge-like design and are fixedly injection-molded onto the pump housing on both sides of the slots.

An angular connector 6 is inserted by a hollow cylindrical end section 7 into the bushing 4 and forms a plug-in connection S with the latter. A sealing ring 8 is arranged between the outer circumferential wall of the end section 7 and the inner wall of the bushing 4. This sealing ring can be secured (in a manner not shown in more detail) either in the bushing 4 or on the relatively short end section 7 of the angular connector 6. If required, it is possible for a corresponding groove to be provided for its axial securing, which groove secures the angular connector 6 in the bushing 4 or on the end section 7 if the plug-in connection S is released. The outer edge of the end section 7 is beveled so that it can easily be introduced into the sealing ring 8 without damaging the latter. The end section 7 of the angular connector 6 is adjoined by a central section 9 having an enlarged diameter which virtually corresponds to the internal diameter of the bushing 4 and thus supports the angular connector 6 radially in the bushing 4. It is conceivable to provide a sliding fit here. The sealing ring 8 is supported in the axial direction against a shoulder 10 forming the transition or jump in diameter from the end section 7 to the central section 9. The central section 9 is adjoined by projections 11 which protrude over its outer extent, are seated, with the plug-in connection S joined together, on the end face of the bushing 4 and form a stop with the latter to which the angular connector 6 can maximally be pushed. The projections at the same time form a means of securing the sealing ring 8 against inadvertently being squashed. In the region of these projections 11 elastic latching hooks 12, as active latching elements, are furthermore integrally molded onto the angular connector 6. In the plan view, they lie on both sides of the center axis of the bushing 4 and thus diametrically opposite one another. Their latching lugs 12a, pointing away from one another, engage, on both sides of the bushing 4, behind the webs 5b of the abutments 5 after the free ends of the latching hooks 12 have been introduced through the slots 5a. Together with the radial guiding in the bushing 4, this results in a sufficiently secure support for the plug-in connection S. This support is also secured against rotation and, with the latching elements designed appropriately, can only be joined together in a specified position. To release this pressure-sealed plug-in connection S, the two latching hooks 12 can simply be pressed together manually, the latching hooks 12 being lifted out of the abutments in order subsequently to pull off the angular connector 6 in the axial direction of the outlet opening 3. The reference number 13 furthermore designates a connecting stub of the angular connector 6, onto which stub a hose or the like can be pushed.

Figure 2:
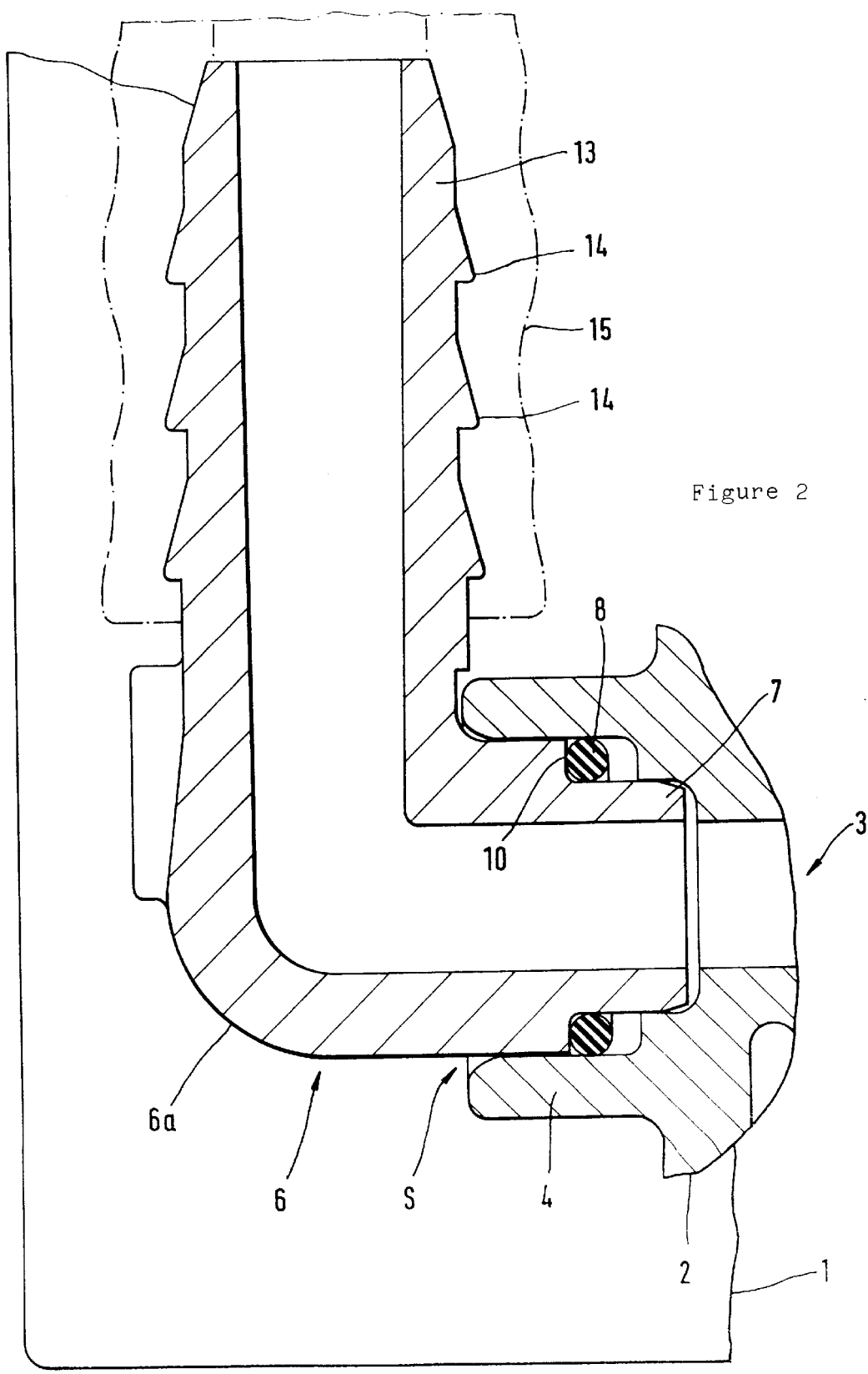
FIG. 2 shows a side view in the section through the center plane of the view in FIG. 1, FIGS. 3 to 5 show refinements of a quarter-turn fastening.

FIG. 2 shows the design of the angular connector 6. The end section 7, which is inserted into the outlet opening 3, can be seen here, as can the sealing ring 8, which bears axially against the shoulder 10, while the latching elements are not shown. One latching hook together with the abutment is cut away, while the other, opposite latching pair is covered by the bushing 4. It can furthermore be seen that the angular connector 6 forms an elbow 6a which deflects the flow from the outlet opening 3 by approximately 90° in the direct vicinity of the wall of the housing 2. Other angles of deflection are also conceivable here. Its upwardly pointing connecting stub 13 is provided with peripheral, approximately sawtooth-shaped ribs 14 which counteract pulling off of a pushed-on line 15 (indicated here only by dash-dotted lines). If required, further means for securing the connection of the line 15 and connecting stub 13, such as hose clips or the like, can be provided. In an embodiment (not shown) of the angular connector 6, the latter has a plurality of connecting stubs 13 and thus forms, integrally as a branched piece, the connection of a plurality of lines to the same outlet opening. This is of advantage in an application in which the pump stage lying before the outlet opening has to supply a plurality of downstream devices. In particular, it is possible in this manner to supply a suction jet pump, which is arranged in a known form near to the bottom of the reservoir, over a short distance with a driving jet if the preliminary stage of the fuel pump takes in fuel from the reservoir.

Figure 3:
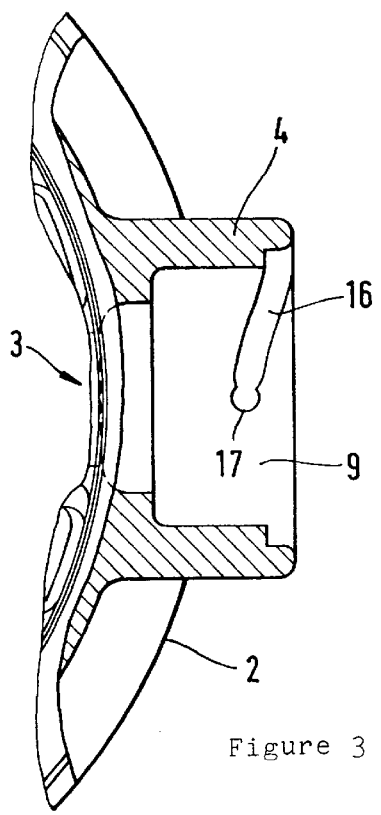
Figure 4:
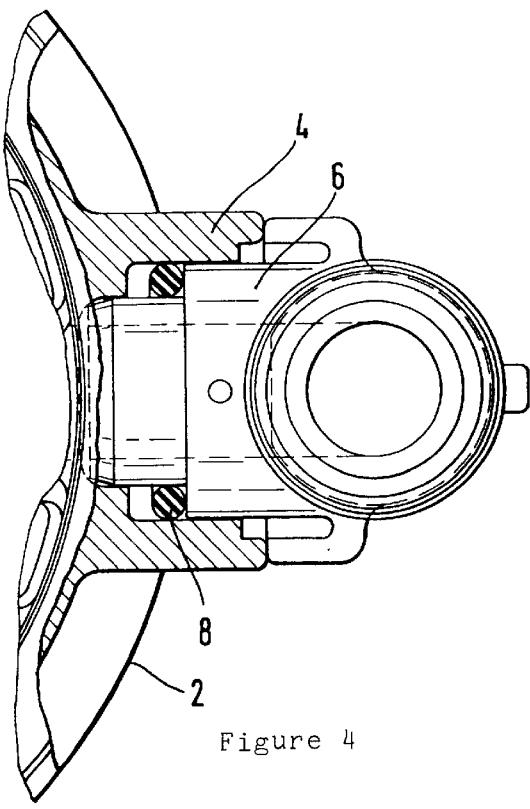
Figure 5:
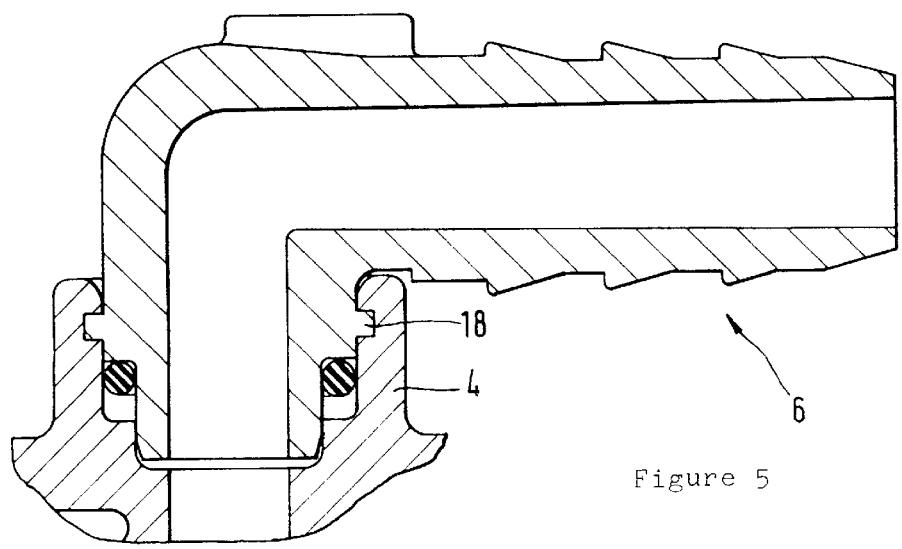

FIGS. 3 to 5 show the refinement of a quarter-turn fastening to connect the angular connector 6 (or a line connection in general) to the housing 2.

FIG. 3 shows that the housing 2 has, in its central section 9, at least two guide grooves 16 which are arranged running spirally towards one another in the central section 9. The end of a guide groove 16 is provided with a refinement for a press fit 17 which will be described.

FIG. 4 shows the fitted angular connector 6. The quarter-turn fastening is designed in such a manner that in the fitted state the sealing ring 8 is pressed together by the angular connector 6. For the fitting, the angular connector 6 is positioned on the housing 2 in a defined manner on the opening (bushing 4) using two opposite guide pins (not shown here) which are situated on the central section 9, and can be brought into its end position by rotation. By means of the press fit 17 in the guide grooves 16, shortly before the end position is reached the angular connector 6 is, after the guide pins have latched into place, connected fixedly but also such that it can be released again, to the housing 2 in a sealing manner.

FIG. 5 shows a side view in the section through the central plane of the view in FIG. 4, in which it can furthermore be seen that the angular connector 6 has guide pins 18 which can also be designed as guideways.

List of Reference Numbers:

1. reservoir
2. housing
3. outlet opening
4. bushing
5. abutment
5a. slots
5b. webs
6. angular connector
6a. elbow
7. end section
8. sealing ring
9. central section
10. shoulder
11. projections
12. elastic latching hooks
12a. latching lugs
13. connecting stub
14. ribs
15. line
16. guide groove
17. press fit
18. guide pins
S plug-in connection

What is claimed is:

1. A fuel delivery unit for use in fuel tanks of vehicles, comprising:

a pump with a housing (2) and an outlet opening (3) arranged laterally thereon, a reservoir (1) filled with fuel and into which the pump is inserted and from whose filing volume fuel is delivered to the outlet opening (3), a rising line (15) connected to the outlet opening (3), wherein the line (15) is connected to the outlet opening (3) by means of a releasable, pressure-sealed plug-in connection (S), having an elbow which deflects the outlet flow in the region of the plug-in connection (S).

2. The fuel delivery unit as claimed in claim 1, wherein the line has a pump end having a straight connector, wherein the elbow has an angled connecting stub (13), wherein the connector is plugged into the angled connecting stub.

3. The fuel delivery unit as claimed in claim 1, wherein the the line (15) has a pump end which is connected to an angular connector (6) which forms the elbow (6a) and wherein the outlet opening (3) has a sleeve, arranged laterally on the pump housing and wherein the angular connector is connected to the sleeve of the outlet opening.

4. The fuel delivery unit of claim 1, further comprising elastic latching elements which are releasably liftable to secure the plug-in connection (S).

5. The fuel delivery unit as claimed in claim 4, wherein the connector (S), is provided with elastic latching hooks (12) which are latched into corresponding abutments (5) in the region of the outlet opening (3).

6. The fuel delivery unit as claimed in claim 5, wherein the latching hooks (12) have latching lugs (12a) pointing away from one another.

7. The fuel delivery unit as claimed in claim 5, wherein two corresponding latching pairs of latching hooks (12) and abutments (5) are provided on each side of the external circumference of the outlet opening (3).

8. The fuel delivery unit as claimed in claim 5, wherein the abutments (5) are bridge-like webs (5b) which are molded onto the pump housing (2) and have slots (5a) receiving the elastic latching hooks.

9. The fuel delivery unit as claimed in claim 8, wherein the webs (5b) extend in a curved manner concentrically to the outlet opening (3) over a subregion of its circumference.

10. The fuel delivery unit of claim 3 further comprising an outlet opening surrounding the outlet opening and wherein the connector (6) at the pump end of the line (15) has a hollow cylindrical end section (7) located in the bushing (4) and sealed therein by a sealing ring (8).

11. The fuel delivery unit of claim 1, wherein the plug-in connection (S) comprises connecting stubs (13) for a plurality of lines (15) to be connected to the outlet opening.

12. The fuel delivery unit of claim 1, wherein the plug-in connection (S) has a quarter-turn fastening.

* * * * *